United States Patent [19]

Kissel

[11] Patent Number: 5,158,605
[45] Date of Patent: Oct. 27, 1992

[54] SOL/GEL POLYMER SURFACE COATINGS AND CORROSION PROTECTION ENHANCEMENT

[75] Inventor: Charles L. Kissel, Anaheim, Calif.

[73] Assignee: Union Oil Company of California, Los Angeles, Calif.

[21] Appl. No.: 705,013

[22] Filed: May 22, 1991

Related U.S. Application Data

[60] Division of Ser. No. 412,839, Sep. 26, 1989, Pat. No. 5,028,489, and a continuation-in-part of Ser. No. 373,401, Jun. 30, 1989, Pat. No. 5,041,486, which is a continuation-in-part of Ser. No. 345,029, Apr. 28, 1989, Pat. No. 5,004,563, which is a continuation-in-part of Ser. No. 305,451, Feb. 1, 1989, Pat. No. 5,004,562.

[51] Int. Cl.$^5$ .................................................. C09D 5/08
[52] U.S. Cl. ............................ 106/14.11; 106/14.13; 106/14.14; 106/14.34; 106/14.36; 252/315.1; 252/315.4
[58] Field of Search ............... 106/14.05, 14.11, 14.13, 106/14.14, 14.34, 14.36; 428/469, 913; 252/315.1, 315.4

[56] References Cited

U.S. PATENT DOCUMENTS

| | | | |
|---|---|---|---|
| 3,330,697 | 7/1967 | Pechini | 501/135 |
| 3,900,620 | 8/1975 | Gilman et al. | 427/408 |
| 4,464,524 | 8/1984 | Karickhoff | 526/313 |
| 4,492,600 | 1/1985 | Brunn | 106/14.34 |
| 4,881,975 | 11/1989 | Collier et al. | 427/417 |

FOREIGN PATENT DOCUMENTS 0844606 7/1981 U.S.S.R. ............................ 106/14.05

OTHER PUBLICATIONS

Eror, Nicholas G. and Anderson, Harlan U., Polymeric Precursor Synthesis of Ceramic Materials, *Mat. Res. Soc. Symp. Proc.*, vol. 73, pp. 571–577 (1986).

Budd, K. D. and Payne, D. A., Preparation of Strontium Titanate Ceramics and Internal Boundary Layer Capacitors by the Pechini Method, *Mat. Res. Soc. Symp. Proc.*, vol. 32, pp. 239–244 (1984).

Lessing, Paul A., Mixed-Cation Oxide Powders Via Polymeric Precursors, *American Ceramic Society Bulletin*, May 1989, pp. 1002–1007.

*Primary Examiner*—William R. Dixon, Jr.
*Assistant Examiner*—Anthony J. Green
*Attorney, Agent, or Firm*—Alan H. Thompson; Greogry F. Wirzbicki

[57] ABSTRACT

Corrosion inhibiting properties in surface coating compositions are increased by admixing a sol or gel containing salt with a polymer and usually a surface coating paste stock. A novel surface coating composition containing a polymer and salt homogeneously distributed in the composition is prepared from the sol or gel and has increased corrosion-inhibiting properties compared to a composition without the admixed sol or gel.

23 Claims, No Drawings

SOL/GEL POLYMER SURFACE COATINGS AND CORROSION PROTECTION ENHANCEMENT

RELATED APPLICATIONS

This application is a division of U.S. patent application Ser. No. 07/412,839, filed Sept. 26, 1989, now U.S. Pat. No. 5,028,489, and a continuation-in-part of U.S. patent application Ser. No. 07/373,401, filed Jun. 30, 1989, now U.S. Pat. No. 5,041,486, which is a continuation-in-part of U.S. patent application Ser. No. 07/345,029, filed Apr. 28, 1989, now U.S. Pat. No. 5,004,563, which is a continuation-in-part of U.S. patent application Ser. No. 07/305,451, filed Feb. 1, 1989, now U.S. Pat. No. 5,004,562.

BACKGROUND OF THE INVENTION

The present invention relates to sol or gel compositions capable of enhancing the corrosion-protection properties of surface coating compositions and paints and particularly latex paints.

Surface coating compositions typically include such materials as paints, lacquers and varnishes. Paints contain pigmented materials whereas lacquers or varnishes are generally clear or transparent. The purposes of surface coatings are aesthetic and/or protective. A coating can enhance the appearance of a substrate in terms of color and gloss as well as give protection against such problems as weathering or corrosion.

In terms of corrosion protection, particularly corrosion protective properties relating to free metal-containing substrates, alternative and improved surface coatings or paints are still being sought. Free metal-containing substrates, particularly iron-containing substrates such as mild steel, cast iron, wrought iron, and the like, and others such as galvanized steel, aluminum, copper, brass, alloys thereof, etc., are vulnerable to exposure damage (i.e., corrosion) without some form of protection. Corrosion includes dry (oxidative) corrosion and stress corrosion. Surface coating defects related to corrosion include rusting, blistering, delamination, undercutting, under-rusting and film form corrosion. Some of the factors which influence the extent to which a surface coating composition or paint will protect metal-containing substrates from corrosion include permeability to water and oxygen, ion migration through the coating film, electrical resistance of the coating, adhesive performance under wet conditions, alkali resistance, the presence of materials which act to inhibit corrosion and the absence of materials which promote corrosion. Such factors have been considered during formulation of oil-base surface coatings and paints. However, it is difficult to formulate waterborne paints, particularly water-dispersible (latex) paints having a high corrosion protection property. The inability to readily formulate corrosion-protective and latex paints is a significant drawback since oil-base paints are being phased out due to environmental restrictions limiting the volatile organic compounds (VOC) content of paints.

SUMMARY OF THE INVENTION

The present invention involves a method for preventing the corrosion of free metal-containing substrates. The method includes enhancing the corrosion protection property of a surface coating composition, including a paint composition, which is applied to such substrates. A sol or gel composition containing a salt is added to a polymer-containing composition, preferably to a surface coating or paint composition containing a polymer, to produce a product surface coating composition having an enhanced corrosion protection property. The salt in the sol or gel composition is contained in sufficient amount to prevent corrosion on a free metal-containing substrate when the surface coating composition containing the salt is coated and dried on the substrate.

The invention also involves a surface coating composition comprising a polymer binder and a salt homogeneously distributed in the composition in sufficient concentration to inhibit the effects of corrosion on a free metal-containing substrate. The protective surface coating composition, particularly a waterborne surface coating composition, comprises a sol or gel composition containing a corrosion protection-enhancing amount of salt, at least one water-soluble or water-dispersible polymer binder, and usually a paste stock containing such ingredients as pigments, coalescing aids, thickening aids, dispersing aids, defoamers, biocides, and fillers.

The protective surface coating compositions of the invention prepared from the sol or gel composition and polymer may be applied to several different free metal-containing substrates. The resultant dried surface coating compositions and the coated free metal-containing substrates formed therefrom provide compositions having substantially enhanced corrosion protection properties compared to compositions not prepared with the described sol or gel compositions. Such compositions and less corrosion-prone coated free metal-containing substrates produced therefrom also retain adequate scrub and wet adhesion properties while gloss is enhanced.

DETAILED DESCRIPTION OF THE INVENTION

The present invention involves a method for protecting free metal-containing substrates from corrosion by enhancing the corrosion protection property of a surface coating composition, including a paint composition, applied to such substrates. The method includes the step of admixing a sol or gel composition containing a salt with a composition containing a polymer to produce a product admixture composition. The salt is contained in the sol or gel composition in a sufficient concentration to increase the corrosion protective property of a surface coating composition derived from the product admixture composition. The product admixture composition can be either the product surface coating composition or a precursor to the product surface coating composition. The method includes the step of blending the product admixture composition with a surface coating paste stock to provide a product surface coating or paint composition having an improved corrosion prevention property compared to one prepared without introducing the salt into the surface coating composition by addition of a salt-containing sol or gel composition. Copending U.S. patent application Ser. No. 373,401, filed Jun. 30, 1989 by the present inventor and incorporated herein by reference in its entirety, describes surface coating compositions effective for inhibiting or reducing corrosion of a free metal-containing substrate due to corrosion-reducing or corrosion-inhibiting properties of the composition.

Copending U.S. patent application Ser. No. 305,451, filed Feb. 1, 1989, by the present inventor and incorporated herein by reference in its entirety, describes salt-containing sol or gel compositions and their method of preparation, and the admixing of the sol or gels with polymers to produce product admixture compositions which are stable and noncoagulated. In addition to a salt, the sol or gel compositions usually contain a nonaqueous solvent, a stabilizer and, optionally, an acidic component. Typically the solvent is an ether, ester, alcohol or combinations thereof (such as ethylene glycol), the stabilizer is either a chelator, such as hydrocarboxylic acid, or a nonionic surfactant, and the acidic component is a protic acid such as nitric acid. Whether or not the acidic component is added to the admixture of solvent, stabilizer and salt, the pH of the admixture, either before or after heating, is generally less than 7.0 and usually less than 4.0. It is preferred that the pH of the admixture of the sol or gel composition be less than about 3.0, particularly when the acidic component is added to the admixture, and it is highly preferred that the pH be less than about 1.0. Also, as will be seen hereinafter in the examples, many instances exist where the pH of the sol or gel composition is less than about 0.1. The salt must be capable of (1) existing as colloidal salt particulates, (2) existing in ion species or (3) forming ions when dispersed in a composition containing a latex polymer. In the formation of a sol or gel, the salt contains cations or anions capable of being dispersed in the admixture of solvent and stabilizer. In one embodiment for preparing the sol or gel containing a solvent, stabilizer, salt and acidic component, the ingredients are admixed at room temperature and slowly heated to a temperature in the range from about 35° C. to about 85° C. for a period sufficient to produce a transparent product, ordinarily from about 0.5 to about 15 hours, and having the color of the characteristic anion or cation of the particular salt in the admixture. The transparent product is a sol or gel composition containing the cations and anions and/or colloidal salt particulates of the particular salt of the admixture. At least one cation and/or at least one anion of the salt is dispersed in the dried resultant latex polymer/salt composition. Polymers contemplated for use in the surface coating compositions described herein include natural polymers such as polymerized oils (for instance, vegetable oils found in varnishes), cellulose and cellulose-derived materials (for instance, nitrocellulose found in lacquers) and various resins (for instance, those found in oil-based paints, lacquers or varnishes), and the like; also synthetic polymers such as thermoplastic and thermosetting polymers as well as semisynthetic polymers. Although all polymers, particularly water-soluble polymers, such as water-soluble resins, are contemplated in the present invention, a preferred polymer is a nonconjugated polymer such as a water-dispersible polymer (particularly latex) disclosed in the aforementioned copending application Ser. No. 305,451. Polymer concentrations in compositions containing a starting latex polymer, particularly those with dispersions in aqueous media, are ordinarily greater than about 0.1 weight percent of the composition. Usually the concentrations are greater than 1 weight percent and preferably greater than 5 weight percent, but most commonly in the range from about 40 to 70 percent for those latexes resulting from emulsion polymerization. An intermediate mixture of salt, stabilizer and solvent is heated to prepare a sol or gel which is typically mixed with a starting latex polymer to produce a product admixture containing the salt and latex polymer.

The invention encompasses surface coating compositions which have a continuous and discontinuous phase, including paints, lacquers and varnishes. The surface coating composition contains a salt derived from a salt-containing sol or gel composition admixed with a composition containing a polymer. The invention is particularly directed to a waterborne surface coating composition wherein the continuous water phase contains a binder comprising a water-soluble polymer, and, more particularly, to waterborne surface coating compositions wherein the discontinuous phase comprises a water-dispersible polymer binder, such as a latex. The discontinuous phase of the surface coating compositions of the invention also contains salt components of the sol or gel compositions described herein and typically a paste stock usually containing one or more of the following components: a pigment, an extender pigment, a coalescing aid, a thickening aid, a dispersing aid, a protective colloid, a defoamer, a biocide, an amine solubilizer, a flow additive, a drier, a cosolvent and a filler material. The waterborne coating compositions of the invention contain water, the sol or gel compositions described herein, usually a paste stock and either water-soluble polymers such as water-soluble resins, alkyds, polyurethanes, unsaturated polyesters, and the like, or water-dispersible polymers such as latex polymers.

Although the invention is not bound by any theory, it is believed that at least some of the particulates derived from the starting salt contained in the sol or gel exists as anions or cations of the salt or as colloidal salt particulates, the derived particulates being homogeneously distributed in the resultant polymer/salt composition comprising the surface coating composition of the invention. Such colloidal salt particulates ordinarily have a diameter less than about 40 nanometers, usually less than about 20 nanometers, and often less than about 10 nanometers. In contrast to conventional surface coating compositions containing dispersed salts from a paste stock (including ground pigments comprising salts, i.e., salt pigments), which are ordinarily capable of settling over time, the salt components introduced into the surface coating compositions of the invention by means of the sol or gel compositions are continuously and permanently distributed throughout the surface coating composition, or a precursor thereof, so as to be homogeneously distributed in the product composition. The term "homogeneously distributed" as used herein refers to those arrangements and distributions of salt components (whether cations, anions or colloidal salt particulates) derived from the sol or gel composition being closer to the homogeneity and permanence existing in a true solution (wherein a salt is completely dissolved in water and permanently maintained in such a phase) than that in conventional surface coating compositions containing ground dispersed salt pigments. The finely ground conventional dispersed paint pigment or other additive comprising a salt is considered herein to be heterogeneously distributed in a surface coating composition. When viewing the distribution of salt components in surface coating compositions with visibility aids weaker than the ultra microscope, the homogeneity of the salt components of the compositions of the invention is better than that for the ground pigment salts, and the like, of conventional surface coating compositions. In the present context, the distribution and arrangement of butterfat particles in homogenized milk, when viewed through a magnifying glass, is considered homogeneous.

Although any polymer binder compatible with the salt components of the sol or gel compositions described herein may be utilized in a surface coating composition of the invention, water-dispersible polymers are preferred. In a preferred embodiment, a typical polymerization process yields an emulsion comprising a latex polymer and water. However, the emulsion can further comprise a surfactant, a chain transfer agent, catalysts, and activators.

The emulsion in combination with the salt-containing sol or gel compositions described herein (i.e., product admixture composition) can be used to replace at least a portion of the polymer binder used in a waterborne surface coating composition, such as a water-base paint composition containing a latex polymer. A typical surface coating or paint composition comprises an emulsion containing a polymer binder, salt (from a sol or gel) which is homogeneously distributed therein, at least one pigment, a coalescing aid, a thickening aid, a dispersing aid, a defoamer, a biocide, and a filler. Coalescing aids, thickening aids, dispersing aids, defoamers, biocides and fillers suitable for use in surface coating paint compositions are well known to those skilled in the art. Exemplary polymer binders include, but are not limited to, resins, vinyl acrylic polymers, acrylic polymers, vinyl chloride acrylic polymers, vinylidene chloride polymers, styrene-butadiene copolymers, styrene-acrylate copolymers, and vinyl acetate-ethylene copolymers. Also included are those polymers disclosed in the aforementioned copending application Ser. No. 305,451. Preferred polymers include vinylidene chloride polymers, vinylacrylic polymers and styrene-acrylate copolymers. Generally, up to about 30 weight percent of the solid content of the polymer binder can be replaced by the product admixture composition of the invention. Usually, the product admixture composition replaces about 1 to about 30 weight percent of the polymer binder's solid content. Preferably, from about 5 to about 25, and more preferably from about 10 to about 20 weight percent of the solid content of the polymer binder is replaced by the product admixture composition. Paint compositions suitable for use in conjunction with the product admixture composition typically have a pigment volume concentration (pvc) of less than about 25 volume by volume percent (v/v %). Preferably, the paint composition has a pvc of about 15 to about 25 v/v %.

In addition to a polymer binder and a sol or gel composition containing a salt, the surface coating composition of the invention can contain a surface coating paste stock. The paste stock, particularly a paste stock suitable in combination with a water-dispersible polymer, usually contains at least one pigment and usually at least one of the aforementioned additives such as a coalescing aid, a thickening aid, a defoamer, a biocide and/or a filler material or extender. Copending U.S. patent application Ser. No. 345,029, filed apr. 28, 1989, by the present inventor and incorporated herein by reference in its entirety, describes compounding ingredients for use during blending with a product admixture composition. In the present invention, a waterborne coating composition containing a water-soluble polymer binder and water usually contains a surface coating paste stock containing at least one pigment and usually at least one additive such as a pigment dispersant, an amine solubilizer, a flow additive, a drier, and/or a cosolvent. Conventional ground pigments useful herein include titanium dioxide; copper carbonate; manganese dioxide; lead, zinc and boron chromates; cadmium sulphide; iron oxides; Prussian blue; cobalt blue; ultramarine; chromium oxide; cadmium selenide; red lead; chrome lead; zinc oxide; antimony oxide and lead or calcium carbonate. The salt components derived from the sol or gel composition described herein can also comprise all or a part of the pigment contained in the surface coating composition. As disclosed in the aforementioned copending U.S. application Ser. No. 305,451, several salts contained in the sol or gel compositions provide either color or colorless compositions. For instance, aluminum acetate sol is yellow, aluminum nitrate sol is colorless, cupric acetate is blue, cobalt acetate is red, neodymium chloride is yellow-green, ferric citrate is brown, etc.

The salt contained in the sol or gel provides an enhancement to the corrosion protection property of the composition. Such enhancement is particularly effective for the corrosion protection property of a paint composition.

Several of the salts contained int he sol or gel compositions, as described in the aforementioned U.S. application Ser. No. 305,451, are utilized to prepare the surface coating compositions of the invention. Particularly useful salts providing corrosion protection properties for the product admixture composition or the surface coating compositions described herein include the acetates, chromates, citrates, molybdates, nitrates, phosphates, plumbates and silicates of aluminum, ammonium, antimony, bismuth, boron, cadmium, calcium, cerium, cesium, chromium, cobalt, copper, dyprosium, europium, gallium, germanium, gold, indium, iron, lanthanum, lead, lithium, magnesium, manganese, mercury, molybdenum, neodymium, nickel, potassium, praseodymium, rubidium, samarium, silicon, silver, sodium, strontium, tellurium, terbium, thallium, uranium, yttrium and zinc. Preferred corrosion protective salts include anions such as acetates, chromtes, molybdates, phosphates, plumbates, and silicates of such cations as ammonium, aluminum, barium, calcium, cadmium, chromium, cobalt, copper, dysprosium, lead, lithium, magnesium, mercury, potassium, praseodymium, silicon, silver, sodium, strontium, uranium and zinc, tetraethylammonium bromide, ferric citrate and yttrium nitrate. Highly preferred salts contain at least one divalent cation, such as a zinc cation, and particularly, in combination with chromates, molybdates, phosphates and silicates. Other highly preferred divalent cations include barium, cadmium, calcium, copper, magnesium, mercury and strontium. Other preferred salts are chromates, molybdates or phosphate-containing salts, such as zinc, ammonium, sodium or zinc chromate, molybdate or phosphate.

In one embodiment of the invention, a sol or gel containing a salt is admixed with a polymer such as a resin. The product admixture composition is blended with a surface paste stock to produce a water-soluble surface coating composition. In a preferred embodiment, the salt-containing sol or gel is admixed with a latex polymer, water and a surface coating paste stock to produce a water-dispersible surface coating composition. The product coating compositions have enhanced corrosion protection properties and such salt addition does not substantially reduce the scrub or wet adhesion properties of the compositions.

The surface coating or paint composition can be applied to at least a portion of a surface of a free metal-containing or substrate. A free metal-containing substrate, as referred to herein, contains at least a portion of a free metal or alloys containing mixtures of free metals.

Typical free metal-containing substrates comprise, for instance, iron, mild steel, cast iron, wrought iron, galvanized steel, stainless steel, aluminum, copper, brass, alloys thereof, and other corrodible free metals.

When applied on free metal-containing substrates, (1) the dried sol or gel composition or (2) the dried product admixture composition or (3) the dried surface coating compositions of the invention described herein are capable of reducing or inhibiting the effects of corrosion. As compared to free metal-containing substrates coated (and dried) with the same surface coating or paint admixture composition but not containing the salt from the sol or gel composition, the free metal-containing substrate coated (and dried) with the compositions containing the salt-containing sol or gel compositions of the invention exhibit either (1) a substantially greater time interval before corrosion effects are indicated on the free metal-containing substrate or (2) less surface area indicating the effects of corrosion over a given period of time in a given environment. When applied to a mild steel substrate (the mild steel containing less than 1 weight percent of carbon), the product admixture composition, surface coating or paint, upon drying, forms a dried composition that typically prevents the formation of rust on the mild steel substrate for at least one week under accelerated weathering conditions.

In the method of the invention, sufficient salt (i.e., a corrosion protection-enhancing amount of salt) is incorporated into the sol or gel composition and/or sufficient sol or gel containing salt is admixed with a composition containing a polymer (and/or a paste stock) in an amount which prevents the formation of rust under accelerated weathering conditions for at least 4 days on a mild steel "Q" panel substrate. "Q" panels contain uncoated mild steel. The product admixture composition, surface coating composition or paint composition is applied to the "Q" panel, dried for one week and subjected to accelerated weathering conditions which are either "salt fog" conditions or QUV Weatherometer conditions for at least 4 days. (QUV Weatherometer conditions are alternating 4 hour intervals of daylight and night (no light) for 1 week with alternating 4 hour rain simulations overlapping the daylight and night intervals. "Salt fog" conditions subjected on the "Q" panels are a water vapor atmosphere containing 3 vol. % chloride (NaCl) at a temperature of 80° C. for 100 hours using a Model No. 411-1ACD cabinet using an ASTM B-117 test). As compared to panels coated with essentially the same composition but not containing the sol or gel composition containing a salt yet exhibiting corrosion effects on at least 0.25 percent of the surface area, free metal-containing substrates coated with the dried compositions of the invention exhibit corrosion effects (such as rusting) on less than 0.2 percent of the surface area, and usually on less than 0.1 percent of the surface area, after at least 4 days under either the "salt fog" or Weatherometer conditions. Under ordinary performance conditions, the surface coating compositions described herein exhibit suitable or improved properties with respect to abrasion, impact, adhesion, flexibility, moisture vapor transmission, pendulum hardness and dry temperature resistance.

An amount of the salt which enhances the corrosion prevention property of the surface coating composition is homogeneously distributed in the surface coating composition of the invention or its precursor by a method involving admixing a sol or gel composition containing sufficient salt with a composition containing a polymer. In general, the particular salt utilized, the particular amount of sol or gel composition and salt amount utilized, depends upon the particular polymer utilized and the particular substrate that is coated. Although the amount of salt contributed from the sol or gel and the amount of polymer are determined by the particular corrosion prevention use, typically the concentration of salt homogeneously distributed in the surface coating composition is about 0.02 and about 1 weight percent. Typically the concentration of sol or gel composition in the surface coating composition which is necessary to achieve such salt concentrations is usually about 0.1 to about 5 weight percent. Furthermore, the concentration of salt in the sol or gel composition is usually about 1 to about 50, preferably about 10 to about 20 weight percent. Moreover, when the sol or gel composition is first admixed with a composition containing a polymer to produce a product admixture composition prior to blending with a surface coating paste stock, the concentration of the sol or gel in the product admixture composition is usually about 0.5 to about 25 weight percent, and the concentration of the salt (from the sol or gel composition) in the product admixture composition is ordinarily about 0.1 to about 5 weight percent.

The sol or gel compositions, the product admixture compositions or the surface coating compositions of the invention are applied either to the surface of an uncoated solid metal-containing substrate, or applied to such substrates over a previously coated surface. Such applied compositions of the invention are dried or cured by suitable methods known in the art (generally exposure to air) to produce a dried, resultant protective coating composition containing a coalesced polymer and salt components derived from the sol or gel composition.

The resulting coated substrate containing both a solid free metal-containing substrate and the dried resultant protective surface coating composition of the invention has a dried resultant surface coating having an enhanced corrosion prevention property compared to that of a similar coating composition not prepared with the sol or gel composition described herein. The surface coating compositions of the invention may, in addition to the corrosion protection properties, contain a controlled quantity of sol or gel composition and/or salt contained therein, so as to have desired opacity and/or color and other visual effects.

The resulting coated substrates produced by the combination of the dried resultant coating composition and the solid substrate upon which the surface coating composition of the invention is at least partially applied may also depend upon the reaction between the salt contained in the sol or gel composition in the coating compositions of the invention and the particular substrate that is coated. As disclosed in copending U.S. patent application Ser. No. 387,933, filed Jul. 31, 1989, a dried resultant coating composition on a coated substrate comprising a wood-containing substrate contains tannin blocking properties effective for reducing the weathering of the wood. The dried resultant protective surface coating paint or product admixture composition of the present invention, contained as a portion of a coated substrate comprising a corrosion-prone substrate (i.e., a free metal-containing substrate), has a corrosion-reducing or corrosion-inhibiting property. Mechanisms for corrosion protection may vary, depending upon which salts, polymers and substrates are involved. For instance, inhibitive salt pigments utilizing a sacrificial cathodic mechanism may be utilized in the sol or gel compositions. Some forms of barrier salts may be provided by the sol or gel compositions. Latex and oil-based polymer compositions may vary the permeability of the applied coating composition in combination with the particular salt utilized. Also, iron-containing and non-iron-containing substrates may typically be protected from corrosion by different mechanisms.

The present invention encompasses salts, introduced into the product admixture, surface coating or paint compositions described herein, which utilize whatever suitable mechanism which reduces the corrosion of a free metal-containing substrate as compared to the same respective polymer containing compositions except not containing the salts derived from the sol or gel compositions.

The invention is further illustrated by the following examples which are illustrative of specific modes of practicing the invention and are not intended as limiting the scope of the invention defined by the appended claims.

EXAMPLE 1

A 2-liter resin kettle is charged with 491.3 g 1,5-pentanediol, 99.82 g zinc acetate, 332.7 g citric acid and 30 ml concentrated nitric acid. The mixture is heated to 65° C. for 6 hours. The material is cooled to room temperature. The resulting material is a sol having a pH of <0.1.

EXAMPLE 2

A 1-liter resin kettle is charged with 246 g ethylene glycol, 50 g zinc acetate, and 166 g of a nonionic surfactant Igepal CO630 polyoxyethylene nonylphenol. The mixture is heated to 40° C. for 6 hours. Upon cooling to room temperature, the resulting material is a sol having a pH of 2.12 and a viscosity of 175 cps (Brookfield).

Sols containing magnesium, manganese, mercurous, strontium and uranyl nitrates are prepared in the same manner as the above-mentioned sol containing zinc acetate, ethylene glycol and the nonionic surfactant. The pH and viscosity properties of the sols are summarized in Table A as follows:

TABLE A

| Cation | pH | Viscosity (Brookfield) |
|---|---|---|
| Mg | 0.1 | 188 |
| Mn | 0.1 | 186 |
| H | 0.1 | 134 |
| Sr | 0.1 | 145 |
| U | 0.1 | 125 |

EXAMPLE 3

The sols of Examples 1 and 2 are each admixed with a latex. Each sol is separately mixed with a styrene-acrylate or and a polyvinylidene chloride (commercially available as 76 RES 1018 and 76 RES 5517, respectively, from Unocal Chemicals Division, Schaumburg, Ill., herein "Unocal"). The sol to latex weight ratio is 1:9, obtained by using 36.0 g sol and 324 g latex. The sols are drawn down on steel Q panels using a 10 mil drawdown bar. The panels are dried for 1 week. The panels are then subjected to a salt fog (3% NaCl) at 80° C. for 100 hours in a Model No. 411-1ACD cabinet manufactured by Industrial Filter & Pump Company of Cicero, Ill. using ASTM B-117 test. Uncoated panels, panels with latex containing no sol, and panels coated with latex admixed with the above described sols are evaluated after the "salt fog" test. The results using SSPC Guide to Vis. 2 are summarized in Table B.

TABLE B

| Coating | Rust Grade | Description* |
|---|---|---|
| None | 1 | approx. 50% of surface rusted |
| 76 RES 1018 | | |
| w/no sol | 5 | approx. 3% of surface rusted |
| w/Zn(OAc)$_2$ citric acid sol | 9 | approx. 0.03% of surface rusted |
| w/Mg(NO$_3$)$_2$ citric acid sol | 8 | approx. 0.1% of surface rusted |
| w/Hg(NO$_3$) citric acid sol | 8 | approx. 0.1% of surface rusted |
| w/Sr(NO$_3$)$_2$ citric acid sol | 8 | approx. 0.1% of surface rusted |
| 76 RES 5517 | | |
| w/no sol | 7 | approx. 0.3% of surface rusted |
| w/Zn(OAc)$_2$ CO630 sol | 8 | approx. 0.1% surface rusted |
| w/Mg(NO$_3$)$_2$ CO630 sol | 9 | approx. 0.03% of surface rusted |
| w/Mn(NO$_3$)$_2$ CO630 sol | 9 | approx. 0.03% of surface rusted |
| w/Hg(NO$_3$) CO630 sol | 9 | approx. 0 03% of surface rusted |
| w/U(NO$_3$)$_2$ CO630 sol | 9 | approx. 0.03% of surface rusted |

*Steel Structures Painting Council, Guide to Visual Standard No. 2, 1 Nov. 82.

The results in Table B indicate that the product admixture composition of sol and latex coated on mild steel panels can reduce corrosion on the panel surfaces by a factor of at least about 10 times, and, in some cases, at least about 100 times that of panels coated with the latex containing no sol.

EXAMPLE 4

A 1-liter resin kettle is charged with 246 g ethylene glycol, 50 g sodium molybdate, 166 g citric acid, and 15 ml concentrated citric acid. The mixture is heated at 45° C. for 3 hours. The product is cooled to room temperature to produce a sol. The sol has a pH of 0.1 and a viscosity of 216 cps (Brookfield).

Sols containing sodium chromate and sodium phosphate (monobasic) are similarly prepared. The pH and viscosity properties of the sols are shown in Table C.

TABLE C

| Anion | pH | Viscosity |
|---|---|---|
| sodium chromate | 0.1 | 222 |
| sodium phosphate | 0.1 | 469 |

EXAMPLE 5

The sols of Example 4 are separately admixed with Unocal latexes containing polyvinyl acrylate (i.e., Unocal 76 RES 3077 and 76 RES 3083). The sol and latex product admixture compositions are drawn down on steel Q panels using a 10 ml drawdown bar. The panels are air dried for 1 week. The panels are then subjected to QUV Weatherometer conditions for 1 week with alternating 4 hour intervals of light and darkness, and overlapping alternating 4 hour rain simulations (using tap water). Corrosion evaluations on uncoated panels, panels coated with latex containing no sol, and panels coated with product admixture compositions containing sol and latex are summarized in Table D.

TABLE D

| Coating | Rust Grade | Description* |
|---|---|---|
| None | 3 | rust on approx. 17% surface |
| 76 RES 3077 | | |
| w/no sol | 5 | rust on approx. 3% surface |
| w/molybdate | 8 | rust on approx. 0.1% surface |
| w/chromate | 9 | rust on approx. 0.03% surface |
| w/phosphate | 9 | rust on approx. 0.03% surface |
| 76 RES 3083 | | |
| w/no sol | 5 | rust on approx. 3% surface |
| w/molybdate | 9 | rust on approx. 0.03% surface |
| w/chromate | 9 | rust on approx. 0.03% surface |
| w/phosphate | 8 | rust on approx. 0.1% surface |

*using SSPC Guide to VIS 2 (Nov. 1, 1982)

The results in Table D indicate that the sol/latex coated panels can reduce corrosion by at least about 10 times and often at least about 100 times that of panels coated with the same latex but containing the salt from the sol.

In view of the foregoing description of the invention including the examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

I claim:

1. A varnish or lacquer composition comprising:
   a nonaqueous solvent,
   a polymer binder, and
   a sufficient amount of a salt in the form of anions, cations and colloidal salt particulates homogeneously distributed in said composition to inhibit the corrosion of a free metal-containing substrate.

2. The composition defined in claim 1 wherein the concentration of said salt in said varnish or lacquer composition is about 0.02 to about 1 weight percent of said total composition.

3. The composition defined in claim 1 wherein said salt comprises colloidal salt particulates selected from the group consisting of chromates, molybdates and phosphates of zinc, sodium and ammonium.

4. A surface coating composition comprising a polymer binder, at least one salt in the form of anions, cations and colloidal salt particulates and a nonaqueous solvent, said salt homogeneously distributed in the surface coating composition in sufficient concentration to inhibit the corrosion of a free metal-containing substrate.

5. The composition defined in claim 4 wherein said salt comprises about 0.02 to about 1 weight percent of said total composition.

6. The composition defined in claim 4 wherein said surface coating composition is a latex-based paint.

7. The composition defined in claim 4 further comprising a surface coating paste stock comprising one or more of the following:
   (a) a coalescing aid,
   (b) a thickening aid,
   (c) a dispersing aid,
   (d) defoamer,
   (e) a biocide,
   (f) a pigment,
   (g) a drier,
   (h) a cosolvent,
   (i) a flow additive, and
   (j) a filler.

8. The composition defined in claim 4 wherein said polymer binder is selected from the group consisting of vinyl acrylic polymers, acrylic polymers, vinyl chloride acrylic polymers, vinylidene chloride polymers, styrene-butadiene copolymers, styrene-acrylate copolymers, and vinyl acetate-ethylene copolymers.

9. The composition defined in claim 4 wherein said salt comprises colloidal salt particulates selected from the group consisting of chromates, molybdates and phosphates of zinc, sodium and ammonium.

10. A surface coating composition comprising:
    (1) a surface coating paste stock,
    (2) a polymer binder,
    (3) a stabilizer comprising a chelator or a nonionic surfactant,
    (4) a nonaqueous solvent comprising an ether, ester, alcohol or combination thereof, (5) at least one salt comprising anions, cations and colloidal particulates, said salt in sufficient amount to enhance the corrosion inhibiting property of said composition when coated on a metal-containing substrate, and
    (6) water.

11. The surface coating composition defined in claim 10 wherein said salt is in a concentration of about 0.01 to about 1 weight percent of said total composition.

12. The surface coating composition defined in claim 10 wherein said chelator comprises citric acid and said nonaqueous solvent comprises ethylene glycol.

13. The surface coating composition defined in claim 10 wherein said salt is selected from the group consisting of the acetates, chromates, molybdates, phosphates, plumbates and silicates of aluminum, ammonium, barium, cadmium, calcium, chromium, cobalt, copper, dysprosium, lead, lithium, magnesium, mercury, potassium, praseodymium, silicon, silver, sodium, strontium, uranium and zinc, tetraethylammonium bromide, ferric citrate, and yttrium nitrate.

14. The composition defined in claim 10 wherein said stabilizer, nonaqueous solvent and salt are contained in said surface coating composition as a sol or gel composition having a pH less than about 4.0.

15. The composition defined in claim 10 wherein said surface coating paste stock comprises one or more of the following:
    (a) a coalescing aid,
    (b) a thickening aid,
    (c) a dispersing aid,
    (d) a defoamer,
    (e) a biocide,
    (f) a pigment,
    (g) a drier,
    (h) a cosolvent,
    (i) a flow additive, and
    (j) a filler.

16. The composition defined in claim 10 wherein said colloidal salt articulates or said cations comprise a divalent cation selected from the group consisting of barium, cadmium, calcium, copper, magnesium, mercury, strontium and zinc.

17. A surface coating composition comprising (1) a latex of a polymer, (2) a surface coating paste stock containing one or more components selected from the group consisting of a pigment, an extruder pigment, a coalescing aid, a thickening aid, a dispersing aid, a protective colloid, a defoamer, a biocide, an amine solubilizer, a flow additive, a drier, a cosolvent and a filler material, (3) a nonaqueous solvent, and (4) at least one salt in the form of anions, cations; and colloidal salt particulates, said salt homogeneously distributed in the surface coating composition in sufficient concentration to inhibit the corrosion of a free metal-containing substrate.

18. The composition defined in claim 17 wherein said surface coating composition further comprises a surfactant or chelator.

19. The composition defined in claim 18 wherein said polymer is selected from the group consisting of vinyl acrylic polymers, acrylic polymers, vinyl chloride acrylic polymers, vinylidene chloride polymers, styrene-butadiene copolymers, styrene-acrylate copolymers, and vinyl acetate-ethylene copolymers.

20. The composition defined in claim 17 wherein said polymer comprises about 40 to about 70 weight percent of said latex and said salt comprises about 0.01 to about 1 weight percent of said total composition.

21. The composition defined in claim 17 wherein a free iron-containing substrate exhibits rust on less than one percent of the surface area of said substrate at one week when said composition is applied and dried on said substrate and subjected to 4 hour intervals of light and darkness with alternating overlapping 4 hour intervals of rain simulation in a QUV Weatherometer.

22. The composition defined in claim 17 wherein said salt is selected from the group consisting of the acetates, chromates, molybdates, phosphates, plumbates and silicates of aluminum, ammonium, barium, cadmium, calcium, chromium, cobalt, copper, dysprosium, lead, lithium, magnesium, mercury, potassium, praseodymium, silicon, silver, sodium, strontium, uranium and zinc, and tetraethylammonium bromide, ferric citrate, and yttrium nitrate.

23. The composition defined in claim 17 wherein said salt comprises a divalent cation selected from the group consisting of barium, cadmium, calcium, copper, magnesium, mercury, strontium and zinc.

* * * * *